US012697627B2

(12) United States Patent
Sun et al.

(10) Patent No.: US 12,697,627 B2
(45) Date of Patent: Aug. 4, 2026

(54) COARSE PARTICLE FLOTATION EQUIPMENT AND METHOD BASED ON COUPLED FLUIDIZATION OF CYCLONE AND DAMPING

(71) Applicant: CENTRAL SOUTH UNIVERSITY, Changsha (CN)

(72) Inventors: Wei Sun, Changsha (CN); Haisheng Han, Changsha (CN); Jian Peng, Changsha (CN); Yao Xiao, Changsha (CN); Yuehua Hu, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 370 days.

(21) Appl. No.: 18/275,034

(22) PCT Filed: Nov. 8, 2021

(86) PCT No.: PCT/CN2021/129315
§ 371 (c)(1),
(2) Date: Jul. 31, 2023

(87) PCT Pub. No.: WO2022/242055
PCT Pub. Date: Nov. 24, 2022

(65) Prior Publication Data
US 2024/0100546 A1 Mar. 28, 2024

(30) Foreign Application Priority Data
May 18, 2021 (CN) ........................ 202110541278.X

(51) Int. Cl.
*B03D 1/24* (2006.01)
*B03D 1/02* (2006.01)

(52) U.S. Cl.
CPC ............... *B03D 1/242* (2013.01); *B03D 1/02* (2013.01)

(58) Field of Classification Search
CPC .......... B03D 1/242; B03D 1/02; B03D 1/028; B03D 1/247; B03D 1/1425; B03D 1/16
See application file for complete search history.

(56) References Cited

U.S. PATENT DOCUMENTS 4,231,860 A * 11/1980 Kuznetsov ........... B03D 1/1406 261/87
2013/0048548 A1 * 2/2013 Dreher ................. B03D 1/1418 210/198.1
2018/0244539 A1 * 8/2018 Asdahl .................... B01F 25/42

FOREIGN PATENT DOCUMENTS

CN 2213575 Y 11/1995
CN 102698879 A * 10/2012
(Continued)

OTHER PUBLICATIONS

Machine translation of CN105562216A (Year: 2016).*
(Continued)

*Primary Examiner* — Patrick Orme
*Assistant Examiner* — Boi-Lien Thi Nguyen
(74) *Attorney, Agent, or Firm* — PORUS IP LLC

(57) ABSTRACT

Coarse particle flotation equipment and method based on coupled fluidization of cyclone and damping are provided. The flotation equipment includes a flotation column. A raw ore feed pipe is provided in an upper part of the flotation column. The flotation column is sequentially divided into a mine tailing bottom launder area, a cyclone mineralization area and a static separation area from bottom to top. A plurality of water-gas mixing jet pipes which are obliquely arranged inwardly and upwardly and communicated with an inner cavity of the flotation column being provided at a side wall of the cyclone mineralization area, jet directions of the plurality of water-gas mixing jet pipes are distributed clockwise or anticlockwise around an axis of the flotation column, and a damping element for reducing turbulence of a water
(Continued)

flow is further provided between the cyclone mineralization area and the static separation area.

8 Claims, 3 Drawing Sheets

(56) References Cited

FOREIGN PATENT DOCUMENTS

| | | | | | |
|---|---|---|---|---|---|
| CN | 203664023 U | * | 6/2014 | | |
| CN | 105562216 A | * | 5/2016 | ............... | B03D 1/14 |
| CN | 108970813 A | * | 12/2018 | ............... | B03D 1/14 |
| CN | 209020582 U | | 6/2019 | | |
| CN | 109759242 B | * | 11/2019 | ............. | B03D 1/247 |
| CN | 110586340 A | | 12/2019 | | |
| CN | 113198619 A | | 8/2021 | | |
| CN | 113499861 A | | 10/2021 | | |

OTHER PUBLICATIONS

Machine translation of CN102698879A (Year: 2012).*
Machine translation of CN203664023U (Year: 2014).*
Machine translation of CN108970813A (Year: 2018).*
Machine translation of CN109759242 (Year: 2019).*

* cited by examiner

COARSE PARTICLE FLOTATION EQUIPMENT AND METHOD BASED ON COUPLED FLUIDIZATION OF CYCLONE AND DAMPING

CROSS REFERENCE TO THE RELATED APPLICATIONS

This application is the national phase entry of International Application No. PCT/CN2021/129315, filed on Nov. 8, 2021, which is based upon and claims priority to Chinese Patent Application No. 202110541278.X, filed on May 18, 2021, the entire contents of which are incorporated herein by reference.

TECHNICAL FIELD

The disclosure belongs to the technical field of mineral processing, and in particular relates to coarse particle flotation equipment and method based on coupled fluidization of cyclone and damping.

BACKGROUND

A core process of flotation is collision and adhesion of bubbles and particles and collection of target mineral particles under suitable physical, chemical and hydrodynamic conditions. A recovery rate of minerals in flotation depends on two factors: hydrodynamic conditions in flotation equipment and interfacial chemistry of particle-bubble interaction. However, it is difficult for an existing mechanically agitated flotation machine to realize recovering of coarse mineral particles, for which a main reason is that high-speed rotation of an impeller in the mechanically agitated flotation machine leads to strong turbulent movement of pulp, which hinders the adhesion between particles and bubbles, and then results in falling off of the bubbles.

SUMMARY

Technical Problem

A main object of the disclosure is to provide coarse particle flotation equipment and method based on coupled fluidization of cyclone and damping, aiming at solving a problem of poor flotation effect of coarse particles in existing flotation equipment.

Solution to the Problem

Technical Solution

In order to solve the above technical problem, the disclosure adopts following technical schemes.

A coarse particle flotation equipment based on coupled fluidization of cyclone and damping includes a flotation column. A raw ore feed pipe is provided in an upper part of the flotation column. The flotation column is sequentially divided into a mine tailing bottom launder area, a cyclone mineralization area and a static separation area from bottom to top. A plurality of water-gas mixing jet pipes which are obliquely arranged inwardly and upwardly and communicated with an inner cavity of the flotation column are provided at a side wall of the cyclone mineralization area. Jet directions of the plurality of water-gas mixing jet pipes are distributed clockwise or anticlockwise around an axis of the flotation column. A damping element for reducing turbulence of a water flow is further provided between the cyclone mineralization area and the static separation area.

Specifically, the damping element includes a plurality of damping plates equidistantly distributed in a circumferential direction of an inner ring wall of the flotation column.

Specifically, the cyclone mineralization area is in a shape of a cone with a big top and a small bottom.

Specifically, a cone angle of the cyclone mineralization area is controlled at 20° to 30°, an included angle between an axis of the water-gas mixing jot pipe and a horizontal plane is controlled at 10° to 15° and an included angle between a first tangent line and a first projection line is controlled at 55° to 65°.

The horizontal plane refers to a plane perpendicular to an axis of the cyclone mineralization area, the first projection line refers to a projection of the axis of the water-gas mixing jet pipe on the horizontal plane, the first tangent line refers to a tangent line passing through a first intersection point and tangent to an excircle contour line of a projection of the cyclone mineralization area on the horizontal plane, and the first intersection point refers to an intersection point of the first projection line and the excircle contour line.

Specifically, a bottom end of the raw ore feed pipe is connected with a raw ore feed distributor.

Specifically, a concentrate overflow launder is provided at a top of the flotation column, and a concentrate discharge pipe is provided on the concentrate overflow launder.

Specifically, the mine tailing bottom launder area is in an inverted cone shape, a mine tailing discharge pipe is provided at a bottom of the mine tailing bottom launder area, and an ore discharge solenoid valve is provided on the mine tailing discharge pipe.

Specifically, a pressure sensor is provided in a mine tailing bottom launder, and both the pressure sensor and the ore discharge solenoid valve are connected with a pressure sensing control box.

Specifically, the coarse particle flotation equipment further includes a water-gas mixing cavitation and foaming system. The water-gas mixing cavitation and foaming system includes a water supply part, a gas supply part and a water-gas mixing foam generator.

The water supply part includes a water storage tank, a water inlet ball valve, a water supply variable frequency pump and a liquid flowmeter which are sequentially connected by a water pipe, and the gas supply part includes an air compressor, an air inlet valve, a gas storage tank, a gas flow regulating valve, a gas flowmeter and a pressure gauge which are sequentially connected by an air pipe.

The water pipe and the air pipe are both communicated with the water-gas mixing foam generator, the water-gas mixing foam generator is communicated with a water-gas mixing loop, and a plurality of water-gas mixing jet pipes are uniformly distributed on an inner ring side of the water-gas mixing loop and communicated with the water-gas mixing loop.

A coarse particle flotation method based on coupled fluidization of cyclone and damping, which uses the above coarse particle flotation equipment for flotation and includes:

- passing a water flow rich in bubbles with a certain velocity and pressure through the water-gas mixing jet pipe so as to be fed into the cyclone mineralization area of the flotation column in a cyclone form to form a cyclone centrifugal force field, and forming a uniform ascending water flow in the static separation area of the flotation column after turbulence of the water flow is reduced by the damping element;

feeding mineralized and evenly mixed raw ore pulp into the flotation column from the raw ore feed pipe to slowly descend along a whole section of the flotation column after the flotation column is filled with water and bubbles and stabilized, so as to gradually form a mineral particle bed layer in the flotation column, and controlling a height of the mineral particle bed layer in the flotation column by adjusting opening of the ore discharge solenoid valve at the bottom of the mine tailing bottom launder area; and continuously descending the top-down raw ore pulp to the cyclone mineralization area in which strong turbulence is generated under action of the cyclone centrifugal force field, particles in the pulp collide efficiently and adhere with bubbles to form a gas-solid-liquid three-phase pulp body, a stable gas-liquid composite fluidized bed layer is formed in the static separation area of the flotation column after bottom-up bubbles and a rising water flow pass through the damping element, so that coarse mineral particles interact with the bubbles and the rising water flow in the gas-liquid composite fluidized bed layer, eventually target minerals continue to rise through buoyancy of the bubbles and a vertical lift of the rising water flow, and then to overflow the flotation column to become concentrate, while gangue minerals sink in the flotation column and eventually are discharged into mine tailing through the mine tailing bottom launder area.

Advantages of the Disclosure

Advantages

Compared with the prior art, at least one embodiment of the disclosure has following beneficial effect.

The damping element and the water-gas mixing jet pipe arranged on the flotation column can realize coupling of cyclone and damping in the flotation equipment, and the static rising water flow can be formed from cyclone and coarse particles with different particle sizes can be caused to be in a suspending state by adjusting a water inlet flow of the water-gas mixing jet pipe; and by adjusting air intake of the water-gas mixing jet pipe, gas content of the liquid and thus the turbulence can be controlled, so that the bubbles are evenly distributed in the rising liquid flow, forming a composite fluidized bed layer based on coupling of cyclone and damping, and at the same time acting to generate the rising liquid flow, forming an upward fluidized bed with a strong thrust, and realizing flotation recovery of coarse mineral particles.

BRIEF DESCRIPTION OF THE DRAWINGS

Description of the Drawings

In order to explain technical schemes in the embodiments of the disclosure more clearly, the drawings required in the description of the embodiments will be briefly introduced below; obviously, the drawings in the following description are only some embodiments of the disclosure, and other drawings can be obtained according to these drawings by those of ordinary skill in the art without paying creative labor.

Figure 1:
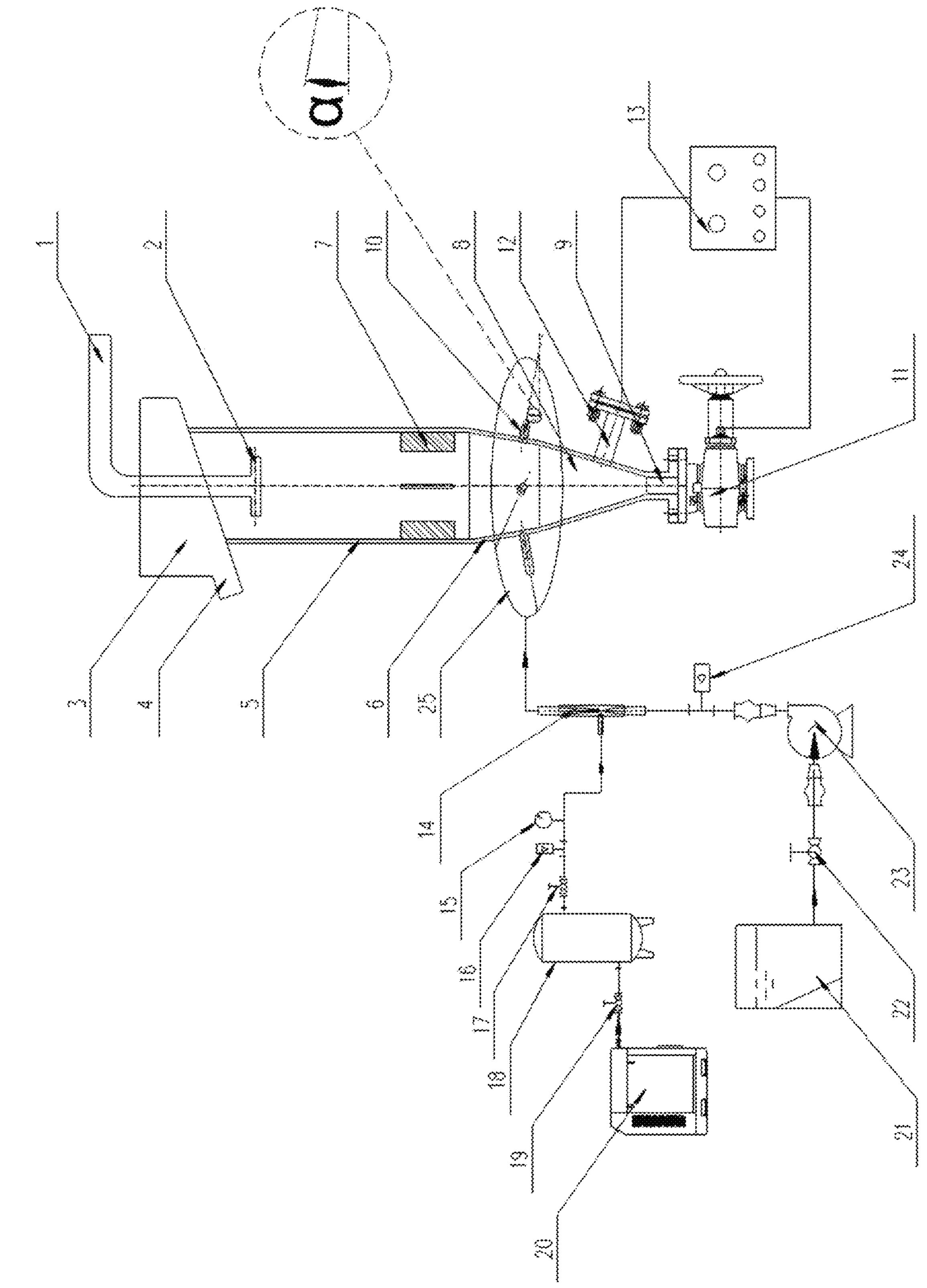
Figure 2:
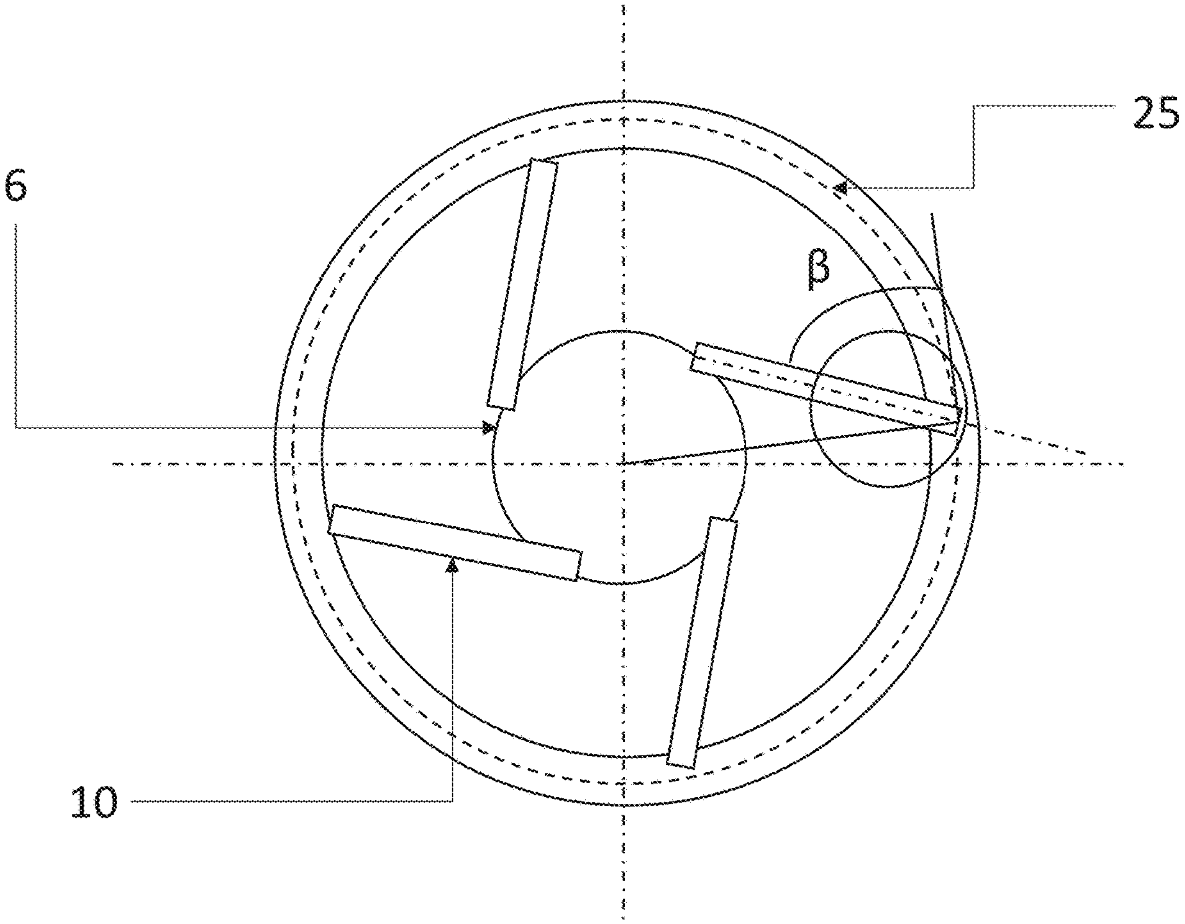
Figure 3:
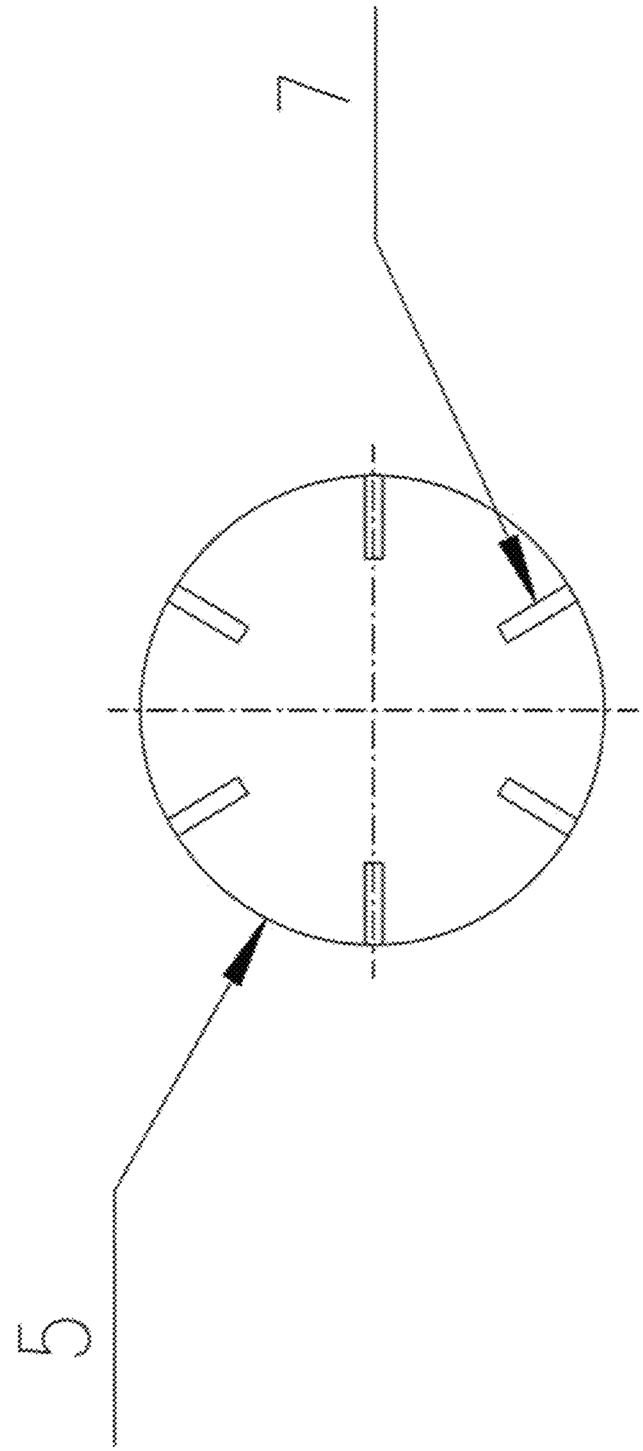

FIG. 1 is a schematic structural diagram of coarse particle flotation equipment according to an embodiment of the disclosure;

FIG. 2 is a top view of connection between a water-gas mixing loop and a water-gas mixing jet pipe according to an embodiment of the disclosure; and FIG. 3 is a top view of a damping element according to an embodiment of the disclosure.

Reference numerals are as follows: 1. Raw Ore Feed Pipe; 2. Raw Ore Feed Distributor; 3. Concentrate Overflow Launder; 4. Concentrate Discharge Pipe; 5. Static Separation Area; 6. Cyclone Mineralization Area; 7. Damping Plate; 8. Mine Tailing Bottom Launder Area; 9. Mine Tailing Discharge Pipe; 10. Water-gas Mixing Jet Pipe; 11. Ore Discharge Solenoid Valve; 12. Pressure Sensor; 13. Pressure Sensing Control Box; 14. Water-gas Mixing Foam Generator; 15. Pressure Gauge; 16. Gas Flowmeter; 17. Gas Flow Regulating Valve; 18. Gas Storage Tank; 19. Air Inlet Valve; 20. Air Compressor; 21. Water Storage Tank; 22. Water Inlet Ball Valve; 23. Water Supply Variable Frequency Pump; 24. Liquid Flowmeter; 25, Water-gas Mixing Loop.

DETAILED DESCRIPTION OF THE EMBODIMENTS

Embodiments of the Disclosure

Implementations of the Disclosure

In the following, the technical scheme in the embodiment of the disclosure will be described clearly and completely in connection with the drawings in the embodiment of the disclosure; obviously, the described embodiment is intended to be only a part of the embodiments of the disclosure, but not all of them. On a basis of the embodiments in the disclosure, all other embodiments obtained by those of ordinary skill in the art without any creative effort are within the protection scope of the disclosure.

In the description of the disclosure, it should be understood that the terms "center", "longitudinal", "lateral", "length", "width", "thickness", "upper", "lower", "front", "rear", "left", "right", "vertical", "horizontal", "top", "bottom", "inner", "outer", "clockwise", "anticlockwise", "axial", "radial", "circumferential" and the like which indicate an orientation or positional relationship are based on the orientation or positional relationship shown in the drawings, and are merely for convenience of describing the disclosure and simplifying the description, rather than indicate or imply that the device or element referred to must have a specific orientation, be configured and operated in a specific orientation, and thus cannot be understood as a limitation on the disclosure.

In addition, the terms "first" and "second" are only configured for descriptive purposes and cannot be understood as indicating or implying a relative importance, or implicitly indicating a number of indicated technical features. Therefore, the features defined as "first" and "second" can include one or more of these features explicitly or implicitly. In the description of the disclosure, "plural" means two or more, unless otherwise specifically defined.

Referring to FIGS. 1 and 2, a coarse particle flotation equipment based on coupled fluidization of cyclone and damping includes a flotation column. A raw ore feed pipe 1 is provided in an upper part of the flotation column, a concentrate overflow launder 3 is provided at a top of the flotation column, a concentrate discharge pipe 4 is provided at a bottom of the concentrate overflow launder 3, a mine tailing discharge pipe 9 is provided at a bottom of a mine tailing bottom launder area 8, an ore discharge solenoid valve 11 is provided on the mine tailing discharge pipe 9, a pressure sensor 12 is provided in the mine tailing bottom launder, and both the pressure sensor 12 and the ore discharge solenoid valve 11 are connected with a pressure sensing control box 13.

Specifically, the flotation column is sequentially divided into the mine tailing bottom launder area 8, a cyclone mineralization area 6 and a static separation area 5 from bottom to top. A plurality of water-gas mixing jet pipes 10 which are obliquely arranged inwardly and upwardly and communicated with an inner cavity of the flotation column are provided at a side wall of the cyclone mineralization area 6. Jet directions of the plurality of water-gas mixing jet pipes 10 are distributed clockwise or anticlockwise around an axis of the flotation column. A damping element for reducing turbulence of a water flow is further provided between the cyclone mineralization area 6 and the static separation area 5.

A process of flotation using the above coarse particle flotation equipment is as follows.

A water flow rich in bubbles with a certain velocity and pressure passes through the water-gas mixing jet pipe 10 so as to be fed into the cyclone mineralization area 6 of the flotation column in a cyclone form to form a cyclone centrifugal force field, and a uniform ascending water flow is formed in the static separation area 5 of the flotation column after turbulence of the water flow is reduced by the damping element.

Mineralized and evenly mixed raw ore pulp is fed into the flotation column from the raw ore feed pipe 1 to slowly descend along a whole section of the flotation column after the flotation column is filled with water and bubbles and stabilized, so as to gradually form a mineral particle bed layer in the flotation column, a height of the mineral particle bed layer in the flotation column is controlled by adjusting opening of the ore discharge solenoid valve 11 at the bottom of the mine tailing bottom launder area 8, and the opening of the ore discharge solenoid valve 11 is controlled by adjusting the pressure sensing control box 13, so as to control a height of the mineral particle bed layer in the flotation column.

The top-down raw ore pulp continuously descends to the cyclone mineralization area 6 in which strong turbulence is generated under action of the cyclone centrifugal force field, particles in the pulp collide efficiently and adhere with bubbles to form a gas-solid-liquid three-phase pulp body, a stable gas-liquid composite fluidized bed layer is formed in the static separation area 5 of the flotation column after bottom-up bubbles and a rising water flow pass through the damping element, so that coarse mineral particles interact with the bubbles and the rising water flow in the gas-liquid composite fluidized bed layer, eventually target minerals continue to rise through buoyancy of the bubbles and a vertical lift of the rising water flow, and then to overflow the flotation column to become concentrate, while gangue minerals sink in the flotation column and eventually are discharged into mine tailing through the mine tailing bottom launder area 8.

In this embodiment, the damping element and the water-gas mixing jet pipe 10 arranged on the flotation column can realize coupling of cyclone and damping in the flotation equipment, and the static rising water flow can be formed from cyclone and coarse particles with different particle sizes can be caused to be in a suspending state by adjusting a water inlet flow of the water-gas mixing jet pipe 10; and by adjusting air intake of the water-gas mixing jet pipe 10, gas content of the liquid and thus the turbulence can be controlled, so that the bubbles are evenly distributed in the rising liquid flow, forming a composite fluidized bed layer based on coupling of cyclone and damping, and at the same time acting to generate the rising liquid flow, forming an upward fluidized bed with a strong thrust, and realizing flotation recovery of coarse mineral particles.

In this embodiment, on the one hand, a swirl flow is formed in the cyclone mineralization area 6 by cyclone feed, which provides a cyclone force field for scavenging, and improves recovery through enhanced separation of the centrifugal force field; on the other hand, water and bubbles are fed together, which effectively increases buoyancy of mineral particles, and under action of the centrifugal force field, increases turbulent intensity of the pulp, improves collision probability between the particles and the bubbles, and causes cyclone mineralization between the mineral particles and the bubbles; and after mineralization, the mineral particles pass through the damping element, which realizes turbulent collision and static separation, eliminates large swirl inside, and enables static separation after entering the cylindrical barrel, thus improving recovery capacity of coarse-grained minerals and difficult-to-be-floated fine-grained minerals.

Referring to FIG. 3, specifically, in actual design, the damping element includes a plurality of damping plates 7 equidistantly distributed in a circumferential direction of an inner ring wall of the flotation column. In order to achieve better damping effect, a height of a damping plate 7 (an axial direction of the flotation column is a height direction of the damping plate 7) is controlled at 80 mm to 100 mm, and a length of the damping plate (a radial direction of the flotation column is a length direction of the damping plate 7) is controlled at 0.3 time to 0.5 time a radius of the static separation area 5.

In practical applications, the cyclone mineralization area 6 is in a shape of a cone with a big top and a small bottom, and a centrifugal force of the cyclone force field in the cyclone mineralization area 6 gradually decreases from bottom to top. Advantage of this design is that turbulence of the pulp output from the cyclone mineralization area 6 is relatively small on a premise that the mineral particles and the bubbles can collide turbulently and strongly, which facilitates static separation of mineral particles.

In specific design and applications, a cone angle of the cyclone mineralization area 6 is controlled at 20° to 30°, an included angle $\alpha$ between an axis of the water-gas mixing jet pipe 10 and a horizontal plane is controlled at 10° to 15°, and an included angle $\beta$ between a first tangent line and a first projection line is controlled at 55° to 65°. The horizontal plane refers to a plane perpendicular to an axis of the cyclone mineralization area. 6, the first projection line refers to a projection of the axis of the water-gas mixing jet pipe 10 on the horizontal plane, the first tangent line refers to a tangent line passing through a first intersection point and tangent to an excircle contour line of a projection of the cyclone mineralization area 6 on the horizontal plane, and the first intersection point refers to an intersection point of the first projection line and the excircle contour line.

Referring to FIG. 1, in some embodiments, the flotation equipment further includes a water-gas mixing cavitation and foaming system. The water-gas mixing cavitation and foaming system includes a water supply part, a gas supply part and a water-gas mixing foam generator 14. The water supply part includes a water storage tank 21, a water inlet ball valve 22, a water supply variable frequency pump 23 and a liquid flowmeter 24 which are sequentially connected by a water pipe, and the gas supply part includes an air compressor 20, an air inlet valve 19, a gas storage tank 18, a gas flow regulating valve 17, a gas flowmeter 16 and a pressure gauge 15 which are sequentially connected by an air pipe. The water pipe and the air pipe are both communicated with the water-gas mixing foam generator 14, and the water-gas mixing foam generator 14 is communicated with a water-gas mixing loop 25, and a plurality of water-gas mixing jet pipes 10 are uniformly distributed on an inner ring side of the water-gas mixing loop 25 and communicated with the water-gas mixing loop 25.

In this embodiment, a turn-on frequency of the variable frequency pump can be controlled according to a numerical value displayed by the liquid flowmeter 24, so as to adjust a water inlet flow of the water-gas mixing foam generator 14, and opening of the gas flow regulating valve 17 can be controlled according to numerical values displayed by the gas flowmeter 16 and the pressure gauge 15, so as to adjust an air inlet flow and a pressure of the water-gas mixing foam generator 14.

Specifically, the mine tailing bottom launder area 8 is in an inverted cone shape, and a cone angle of the mine tailing bottom launder area is controlled at 20° to 30°, and a pressure sensor 12 is provided in a side wall of the mine tailing bottom launder area, the pressure sensor is connected with the pressure sensing control box 13 and the ore discharge solenoid valve 11. When the pressure sensor 12 operates, the pressure sensing control box can monitor a pressure of mine tailing pulp in the mine tailing bottom launder in real time, and the pressure sensing control box 13 controls a height of the fluidized bed layer through a numerical value of the pressure sensor 12, controls the opening of the ore discharge solenoid valve 11 by adjusting the pressure sensing control box 13, adjusts the inflow water flow through the liquid flowmeter 24, and adjusts the inflow air flow through the gas flowmeter 16, thereby adjusting separation effect.

Specifically, a bottom of the raw ore feed pipe 1 is connected with a raw ore feed distributor 2. The raw ore feed distributor 2 is vertically downward arranged at a center of the flotation column. The static separation area 5 is in a cylindrical shape, and the concentrate overflow launder 3 is provided at an upper periphery of the static separation area 5, and the raw ore feed pipe 1 is provided at a side of an upper part of the static separation area. A bottom plate of the concentrate overflow launder 3 is provided with the concentrate discharge pipe 4, and the bottom plate of the concentrate overflow launder 3 is lower than a top opening of the static separation area 5, and the bottom plate of the concentrate overflow launder 3 has a certain inclination angle. An included angle between the bottom plate and the axis of the flotation column is 50° to 80°. Advantages of the above design is that flotation concentrate particles can be discharged quickly, so as to avoid blockage caused by accumulation of the flotation concentrate particles in the concentrate overflow launder 3 and ensure operation stability of the equipment. Meanwhile, in order to prevent floating pulp from overflowing, the concentrate overflow launder 3 is provided with a cover plate, which can prevent the pulp and foam from overflowing and ensure operation stability of the coarse particle flotation equipment.

In this embodiment, after the equipment is filled with water and gas, pre-mineralized and evenly mixed pulp flows to the raw ore feed distributor 2 through the raw ore feed pipe 1 by itself, and flows into a foam layer above a pulp level in the flotation column through the raw ore feed distributor 2. Coarse-grained minerals are pre-separated in a foam area and gradually form a mineral particle bed layer in the static separation area 5. With continuous flotation, bubbles in the static separation area 5 carry the coarse-grained minerals to float and accumulate to form the foam layer. When a height of the foam layer exceeds an upper end face of the flotation column, the flotation concentrate in the foam layer overflows the flotation column and flows out of the concentrate discharge pipe 4 through the concentrate overflow launder 3.

Referring to FIG. 1, a flotation method using the flotation equipment includes the following.

a: The air compressor 20 is started, the air inlet valve 19 is opened, and the gas storage tank 18 is charged; and the water inlet ball valve 22 is opened, the water supply variable frequency pump 23 is started, water is pumped into the water-gas mixing foam generator 14 through the water supply variable frequency pump 23, and the liquid flowmeter 24 in a pipeline between the water supply variable frequency pump 23 and the water-gas mixing foam generator 14 is adjusted at the same time to adjust the water inlet flow of the water-gas mixing foam generator 14.

b: The gas flow regulating valve 17 and the gas flowmeter 16 on a pipeline between the gas storage tank 18 and a gas inlet end of the water-gas mixing foam generator are opened, and thus amount of gas entering the water-gas mixed foaming device 14 is controlled.

c: A water-gas mixture forms a jet with a certain velocity in the water-gas mixing foam generator 14, and because an area of a middle passage of the water-gas mixing foam generator 14 is suddenly reduced, a flowing velocity is sharply increased, and a pressure in the fluid is suddenly reduced, air is sucked under a negative pressure generated by the jet, and the air is crushed and mixed into a pulp mixture to form dissolved gas; and a large number of microbubbles are generated by gas precipitation in a solution, and at the same time, an upward water flow rich in microbubbles with a certain velocity and pressure is formed.

d, the water flow rich in microbubbles with the certain velocity and pressure is evenly divided into 4 water-gas mixing jet pipes 10 through the water-gas mixing loop 25, and is fed into middle and lower parts of the flotation equipment in a cyclone form along a side wall of the cyclone mineralization area 6 at a certain pressure, and a pressurized water flow enters the flotation column, and after passing through the damping plate 7, a uniform rising water flow is formed in the flotation column.

e, after the equipment is filled with water and bubbles and stabilized, a raw ore feed device is started, and the mineralized and evenly mixed raw ore pulp may be fed from the raw ore feed pipe 1, and the feed can enter the flotation column after being dispersed from a top of the flotation column via the raw ore feed distributor 2 and slowly descend along a whole section of the column, thus gradually forming a mineral particle bed layer in the flotation column.

f, opening of the ore discharge solenoid valve 11 is controlled by adjusting the pressure sensing control box 13, so as to control a height of the mineral particle bed layer in the column of the flotation equipment.

g, the top-down raw ore pulp continuously descends to the cyclone mineralization area 6, in which strong turbulence is generated under action of the cyclone centrifugal force field and the damping plate 7, so that particles in the pulp collide efficiently and adhere with bubbles to form a gas-solid-liquid three-phase pulp body; a stable gas-liquid composite fluidized bed layer is formed in the flotation column by bottom-up bubbles and a rising water flow; and coarse particle minerals interact with the bubbles and the rising water flow in the gas-liquid composite fluidized bed layer, and eventually target minerals continue to rise through buoyancy of the bubbles and a vertical lift of the rising water flow, and then to overflow the cylindrical barrel into the concentrate overflow launder 3 to become concentrate from the concentrate discharge pipe 4, while gangue minerals sink in the column and eventually are discharged into mine tailing from the mine tailing discharge pipe 9 through the mine tailing bottom launder.

Unless otherwise stated, in any technical scheme provided in the disclosure, if a numerical range is disclosed, the disclosed numerical range is a preferred numerical range, and any skilled in the art should understand that the preferred numerical range is only a numerical value with obvious or representative technical effect among many implementable numerical values. Because there are too many numerical values to be exhaustive, some numerical values are disclosed to illustrate the technical scheme of the disclosure, and the above listed numerical values should not limit protection scope of the disclosure.

Meanwhile, if the above disclosure provides or involves parts or structural members that are fixedly connected with each other, then, unless otherwise stated, an expression fixedly connected can be understood as: detachably and fixedly connected (for example, using bolts or screws) or non-detachably and fixedly connected (for example, riveted and welded). Of course, being fixedly connected with each other can also be replaced by an integral structure (for example, fabricated and integrally formed by a casting process) (except cases where an integrated forming process obviously cannot be used).

In addition, unless otherwise stated, terms used to express a positional relationship or shape in any technical scheme provided in the above disclosure involves states or shapes that are approximate, similar or close to the positional relationship or shape. Any component provided by the disclosure can be assembled by a plurality of independent constituent parts, or can be an independent component manufactured by an integrated forming process.

The above embodiments are only examples that clearly illustrate the disclosure, and are not limiting of implementations. For those of ordinary skill in the art, other changes or variations in different forms can be made on a basis of above description. It is neither necessary nor possible to exhaust all the embodiments here. However, obvious changes or variations derived therefrom still fall within the protection scope of the disclosure.

What is claimed is:

1. A coarse particle flotation equipment based on a coupled fluidization of cyclone and damping, comprising a flotation column, a raw ore feed pipe being provided in an upper part of the flotation column, wherein the flotation column is sequentially divided into a mine tailing bottom launder area, a cyclone mineralization area, and a static separation area from bottom to top, wherein a plurality of water-gas mixing jet pipes are obliquely arranged inwardly and upwardly and communicated with an inner cavity of the flotation column, and the plurality of water-gas mixing jet pipes are provided at a side wall of the cyclone mineralization area, jet directions of the plurality of water-gas mixing jet pipes are distributed clockwise or anticlockwise around an axis of the flotation column, and a damping element for reducing a turbulence of a water flow is further provided between the cyclone mineralization area and the static separation area;

the damping element comprises a plurality of damping plates equidistantly distributed in a circumferential direction of an inner ring wall of the flotation column; wherein a height of each of the plurality of damping plates is controlled at 80 mm to 100 mm, and a length of each of the plurality of damping plates is controlled at 0.3 time to 0.5 time a radius of the static separation area;

the cyclone mineralization area is in a shape of an inverted cone with a top diameter larger than a bottom diameter, wherein a cone angle of the cyclone mineralization area is controlled at 20° to 30°, an included angle between an axis of each of the plurality of water-gas mixing jet pipes and a horizontal plane is controlled at 10° to 15°, and an included angle between a first tangent line and a first projection line is controlled at 55° to 65°, wherein the horizontal plane refers to a plane perpendicular to an axis of the cyclone mineralization area, the first projection line refers to a projection of the axis of each of the plurality of water-gas mixing jet pipes on the horizontal plane, the first tangent line refers to a tangent line passing through a first intersection point and tangent to an excircle contour line of a projection of the cyclone mineralization area on the horizontal plane, and the first intersection point refers to an intersection point of the first projection line and the excircle contour line.

2. The coarse particle flotation equipment according to claim 1, wherein a bottom end of the raw ore feed pipe is connected with a raw ore feed distributor.

3. The coarse particle flotation equipment according to claim 1, wherein a concentrate overflow launder is provided at a top of the flotation column, and a concentrate discharge pipe is provided on the concentrate overflow launder.

4. The coarse particle flotation equipment according to claim 3, wherein a bottom plate of the concentrate overflow launder is lower than a top opening of the static separation area and an included angle between the bottom plate and the axis of the flotation column is 50° to 80°.

5. The coarse particle flotation equipment according to claim 1, wherein the mine tailing bottom launder area is in an inverted cone shape, a mine tailing discharge pipe is provided at a bottom of the mine tailing bottom launder area, and an ore discharge solenoid valve is provided on the mine tailing discharge pipe.

6. The coarse particle flotation equipment according to claim 5, wherein a pressure sensor is provided in a mine tailing bottom launder, and the pressure sensor and the ore discharge solenoid valve are connected with a pressure sensing control box.

7. The coarse particle flotation equipment according to claim 1, further comprising a water-gas mixing cavitation and foaming system, wherein the water-gas mixing cavitation and foaming system comprises a water supply part, a gas supply part, and a water-gas mixing foam generator, wherein the water supply part comprises a water storage tank, a water inlet ball valve, a water supply variable frequency pump, and a liquid flowmeter, wherein the water storage tank, the water inlet ball valve, the water supply variable frequency pump, and the liquid flowmeter are sequentially connected by a water pipe, and the gas supply part comprises an air compressor, an air inlet valve, a gas storage tank, a gas flow regulating valve, a gas flowmeter, and a pressure gauge, wherein the air compressor, the air inlet valve, the gas storage tank, the gas flow regulating valve, the gas flowmeter, and the pressure gauge are sequentially connected by an air pipe;

the water pipe and the air pipe are communicated with the water-gas mixing foam generator, the water-gas mixing foam generator is communicated with a water-gas mixing loop, and the plurality of water-gas mixing jet pipes are uniformly distributed on an inner ring side of the water-gas mixing loop and communicated with the water-gas mixing loop;

a turn-on frequency of the variable frequency pump is controlled based on a numerical value displayed by the liquid flowmeter to adjust a water inlet flow of the water-gas mixing foam generator; and an opening of the gas flow regulating valve is controlled based on numerical values displayed by the gas flowmeter and the pressure gauge to adjust an air inlet flow and a pressure of the water-gas mixing foam generator.

8. A coarse particle flotation method based on a coupled fluidization of cyclone and damping, wherein the coarse particle flotation method uses the coarse particle flotation equipment according to claim 1, comprising:

passing a water flow rich in bubbles with a predetermined velocity and pressure through the plurality of water-gas mixing jet pipes to be fed into the cyclone mineralization area of the flotation column in a cyclone form to form a cyclone centrifugal force field, and forming a uniform ascending water flow in the static separation area of the flotation column after the turbulence of the water flow is reduced by the damping element;

feeding mineralized and evenly mixed raw ore pulp into the flotation column from the raw ore feed pipe to slowly descend along a whole section of the flotation column after the flotation column is filled with water and the bubbles and stabilized, to gradually form a mineral particle bed layer in the flotation column; and continuously descending the raw ore pulp to the cyclone mineralization area where a strong turbulence is generated under an action of the cyclone centrifugal force field, particles in the raw ore pulp collide efficiently and adhere with the bubbles to form a gas-solid-liquid three-phase pulp body, a stable gas-liquid composite fluidized bed layer is formed in the static separation area of the flotation column after the bubbles and a rising water flow pass upwardly through the damping element, wherein coarse mineral particles interact with the bubbles and the rising water flow in the gas-liquid composite fluidized bed layer, target minerals continue to rise through a buoyancy of the bubbles and a vertical lift of the rising water flow, and to overflow the flotation column to become a concentrate, while gangue minerals sink in the flotation column and are discharged into a mine tailing through the mine tailing bottom launder area.

* * * * *